United States Patent [19]
Hollingsworth et al.

[11] Patent Number: 5,400,895
[45] Date of Patent: * Mar. 28, 1995

[54] TOBACCO CONTAINER SORTING CONVEYOR

[75] Inventors: Alexander Hollingsworth, Arden; John Metalsky, Hendersonville, both of N.C.

[73] Assignee: Fishburne International, Inc., Arden, N.C.

[ * ] Notice: The portion of the term of this patent subsequent to Feb. 15, 2011 has been disclaimed.

[21] Appl. No.: 12,144

[22] Filed: Jan. 28, 1993

Related U.S. Application Data

[63] Continuation-in-part of Ser. No. 890,001, May 29, 1992, Pat. No. 5,285,885.

[51] Int. Cl.⁶ .................................................. B65G 47/46
[52] U.S. Cl. ........................................ 198/367; 198/494; 198/841; 198/372
[58] Field of Search .............. 198/349.6, 349.9, 367, 198/370, 372, 494, 498, 841, 853

[56] References Cited

U.S. PATENT DOCUMENTS

| | | | |
|---|---|---|---|
| 2,728,466 | 12/1955 | Postlewaite et al. | 198/367 |
| 2,795,056 | 6/1957 | Remer | 198/494 |
| 3,045,801 | 7/1962 | Graybeal | 198/372 |
| 3,071,239 | 1/1963 | Burtness | 198/372 |
| 3,198,308 | 8/1965 | Driesch et al. | 198/372 |
| 3,242,342 | 3/1966 | Gabar | 198/370 |
| 3,246,733 | 4/1966 | Torbet et al. | 198/372 |
| 3,462,000 | 8/1969 | Bachman | 198/28 |
| 3,465,870 | 9/1969 | Paulsen | 198/188 |
| 3,515,254 | 6/1970 | Gary | 198/372 |
| 3,543,916 | 12/1970 | Berk | 198/220 |
| 3,743,090 | 7/1973 | Brown et al. | 198/349.9 |
| 4,213,527 | 7/1980 | Lapeyne et al. | 198/853 |
| 4,549,272 | 10/1985 | Hagan et al. | 198/370 |
| 4,724,953 | 2/1988 | Winchester | 198/841 |
| 4,850,471 | 7/1989 | Annas, Sr. et al. | 198/349.3 |

OTHER PUBLICATIONS

Acco, "Sortrac Brochure", 1987, pp. 1–16.
Intialox, Inc., "Intialox Conveyor Belt Engineering Manual", Undated (but believed to be 1991 or earlier) pp. 4–5, 37A–B, 39, 54, 55.

*Primary Examiner*—Joseph E. Valenza
*Attorney, Agent, or Firm*—Cort Flint

[57] ABSTRACT

An endless transport conveyor for sorting tobacco containers, specifically sheets and bales. The tobacco container sorting conveyor includes an endless foraminous belt with top and bottom runs, a slotted support located below the top run, a collecting pan located below the support and a motor for driving the endless belt. A supply conveyor is adjacent one end of the transport conveyor and loads the tobacco containers onto the belt. As the tobacco containers are conveyed, tobacco particles that fall through the belt and support are received on the collecting pan. Diverting assemblies mounted along one side of or above the belt selectively divert the tobacco containers, via the input from sensors, into station chutes mounted along one or both sides of the belt and opposite from each diverting assembly. An end chute and bin may extend from the end of the transport conveyor or opposite the supply conveyor for collecting tobacco waste too large to fall through the belt.

11 Claims, 9 Drawing Sheets

TOBACCO CONTAINER SORTING CONVEYOR

RELATED APPLICATIONS

This application is a continuation-in-part of U.S. patent application Ser. No. 07/890,001, filed May 29, 1992, now U.S. Pat. No. 5,285,885.

FIELD OF THE INVENTION

This invention relates to an endless conveyor capable of directing and sorting tobacco containers. More specifically, the conveyor has an endless foraminous belt with top and bottom runs, a slotted support located below the top run, and a collecting pan located below the slotted support for collecting tobacco particles falling from tobacco containers conveyed across the top run. Station chutes line at least one side of the conveyor and catch the tobacco containers as they are selectively diverted off the conveyor belt. An end chute and bin may be located at the end of the belt for catching tobacco particles and waste that do not fall through the belt.

BACKGROUND OF THE INVENTION

Endless conveyors for selectively diverting conveyed material off the conveyor belt into a work station or diversion chute are well known. However, none of the prior conveyors were designed to be used primarily with tobacco containers such as bales and/or sheets, or designed in an efficient or economic manner.

Tobacco, before processing, is typically placed in one of two different types of containers, sheets and bales. Sheets are formed by placing hands of tobacco into a burlap sheet, bringing the corners of the sheet together and tying the corners together. Each sheet is approximately 4'×5'. Bales are formed by placing hands of tobacco into a wooden form, manually compressing the tobacco within the form and securing it with twine. Each bale is approximately 1'×2½'×3'. While these types of containers provide a means for separating the tobacco leaves into discrete bundles, they do not fully enclose the tobacco. Thus, during subsequent handling, conveying and sorting, the tobacco leaves can break and tobacco particles can fall from the bales or sheets.

Once the tobacco sheets and bales are delivered to a processing factory, they are first sorted by grade and then moved to a rack or pallet specified for that grade.

One disadvantage of the prior art sorting conveyors is that they do not handle the fragile tobacco sheets and bales gently. Furthermore, leaves and particles of tobacco are pulled or fall out of the sheets and bales as they are conveyed, thus making the tobacco sorting process very wasteful, dusty, and messy. In addition, many of the prior art conveyors are not efficiently or economically designed to sort tobacco containers. Finally, the dust and waste resulting from the prior art conveyors slows the sorting process and is environmentally unsafe for the workers.

Examples of some prior endless conveyor systems are disclosed in the following U.S. Pat. Nos.: 3,462,000 to Bachman; 3,465,870 to Paulsen; 3,543,916 to Berk; and 4,850,471 to Annas, Sr. et al.

Thus, there exists a need to provide an improved endless conveyor system for sorting tobacco sheets and bales. This invention addresses this need in the art, along with other needs, which will become apparent to those skilled in the art once given this disclosure.

SUMMARY OF THE INVENTION

Accordingly, a primary object of the invention is to provide an endless conveyor for sorting tobacco sheets and bales which is gentle on the tobacco containers and resists their coming apart.

Another object of the invention is to provide an endless conveyor for sorting tobacco sheets and bales which is beneficial to the environment by allowing less dust into the air and onto the factory floor.

Another object of the invention is to provide an endless conveyor for sorting tobacco sheets and bales which minimizes tobacco waste and is efficient and economical to build and operate.

A further object of the invention is to provide an endless conveyor for sorting tobacco which improves working conditions due to less dust and waste.

The foregoing objects are basically attained by providing a tobacco container sorting conveyor, the combination comprising: a support; an endless conveyor coupled to said support and having first and second sides; means for collecting the tobacco containers located along said endless conveyor comprising a first set of collecting means on said first side, and a second set of collecting means on said second side, each of said collecting means in said first set being transversely aligned with one of said collecting means in said second set, and thereby forming a set of transverse pairs of collecting means; means for diverting the tobacco containers located between each transverse pair of collecting means; and means, coupled to each of said diverting means, for selectively actuating each of said diverting means to divert a selected tobacco container into a selected collecting means on either side of said endless conveyor.

Other objects, advantages and salient features of the invention will become apparent from the following detailed description, which, taken in conjunction with the annexed drawings, discloses preferred embodiments of the invention.

BRIEF DESCRIPTION OF THE INVENTION

Referring now to the drawings which form part of this original disclosure.

DETAILED DESCRIPTION OF THE INVENTION

Figure 1:
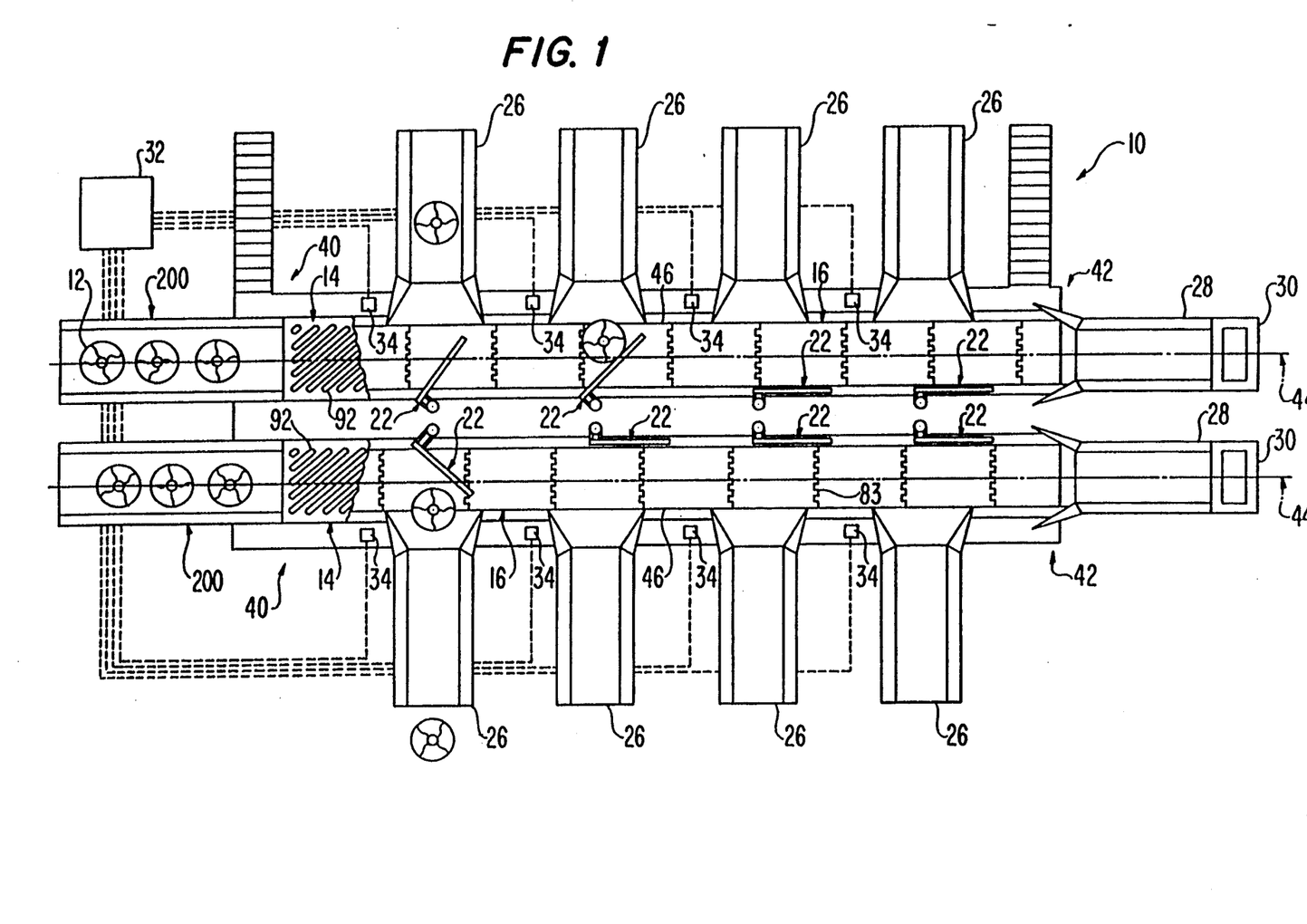
FIG. 1 is a top plan view of side-by-side tobacco container sorting conveyors with a portion of the conveyor belt broken away to show the slotted support in accordance with the present invention.
Figure 2:
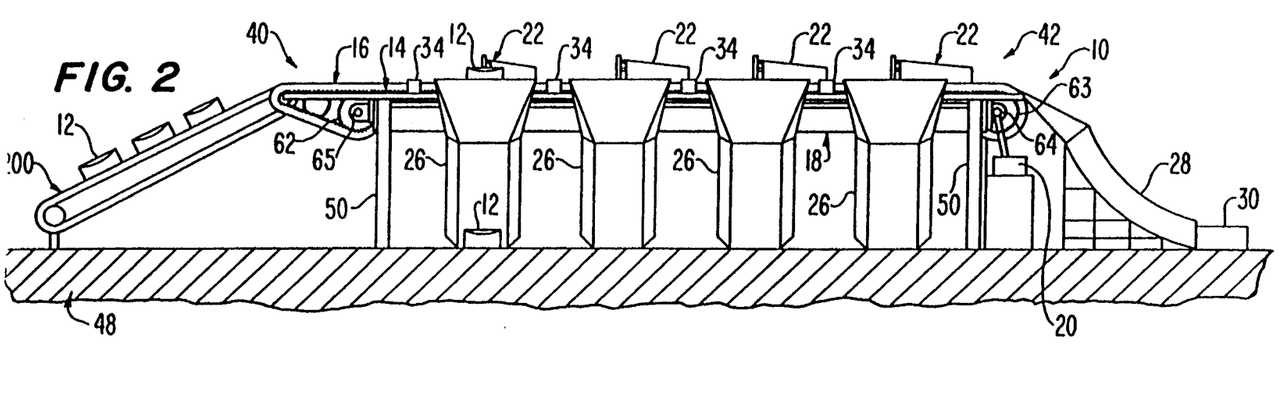
FIG. 2 is a side elevational view of the tobacco container sorting conveyors of FIG. 1.

As seen in FIGS. 1 and 2, a tobacco container sorting conveyor 10 in accordance with the present invention is illustrated, and includes a support 14, an endless transport conveyor 16 slidably received across the support 14, a collecting device or pan 18 mounted below the support 14 for collecting tobacco particles falling from tobacco containers 12 conveyed by the endless transport conveyor 16, and a conveyor drive motor 20.

Figure 7:
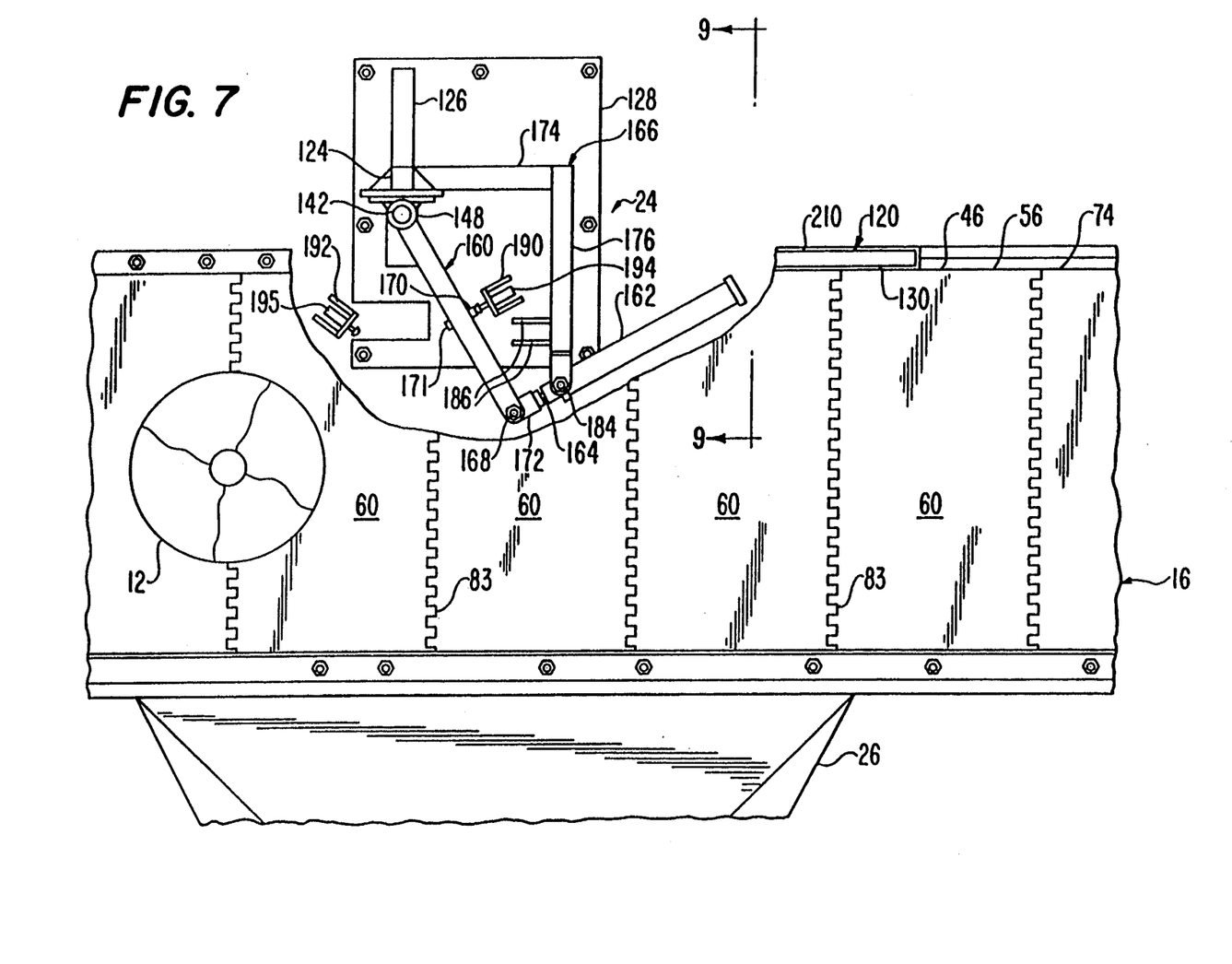
FIG. 7 is a partial top plan view of the conveyor partially broken away to show the diverter activating system with the diverter blade in its rest position.
Figure 8:
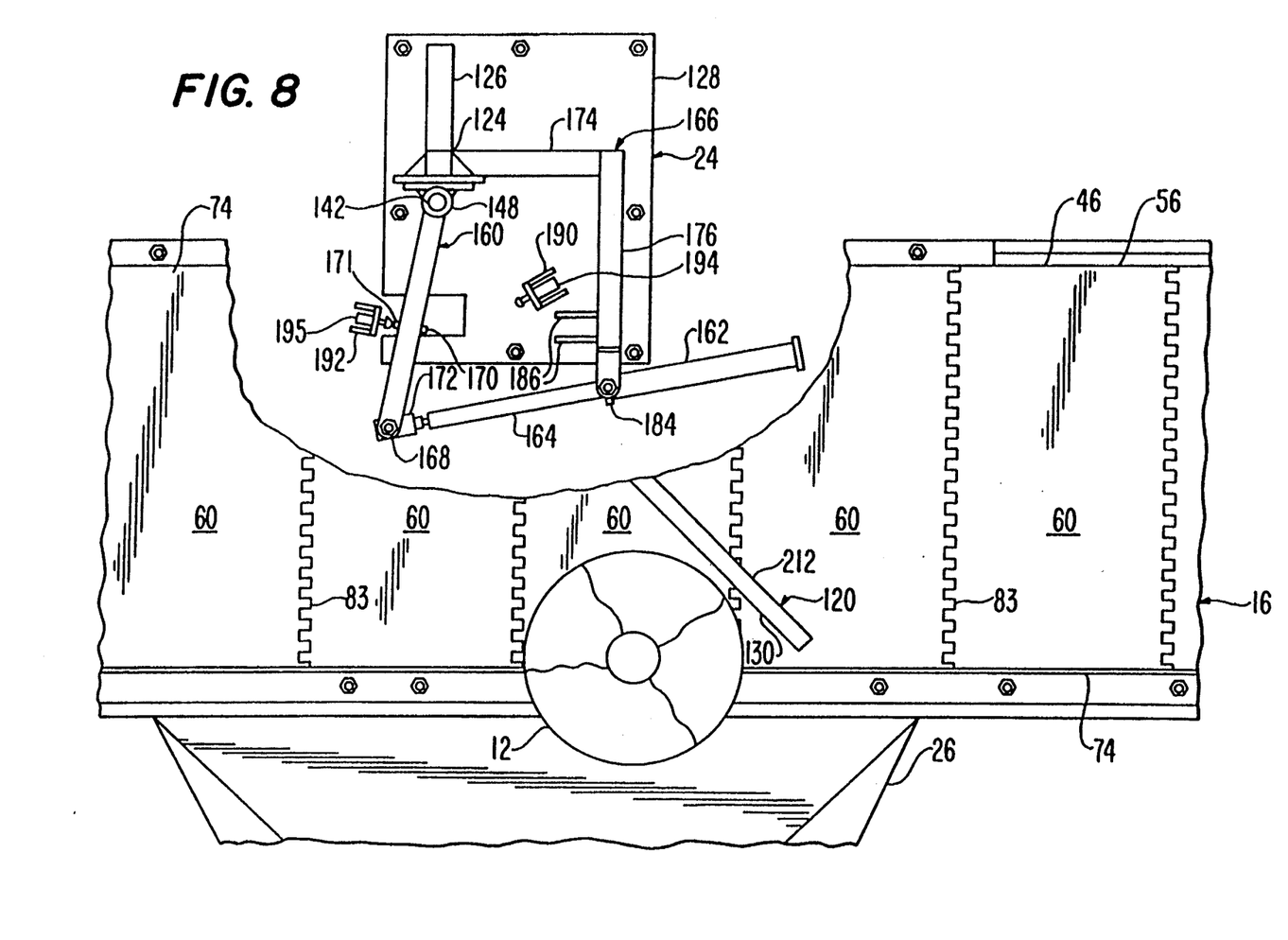
FIG. 8 is a partial top plan view of the conveyor belt partially broaden away to show the diverter activating system with the diverter blade in its engaging position.
Figure 9:
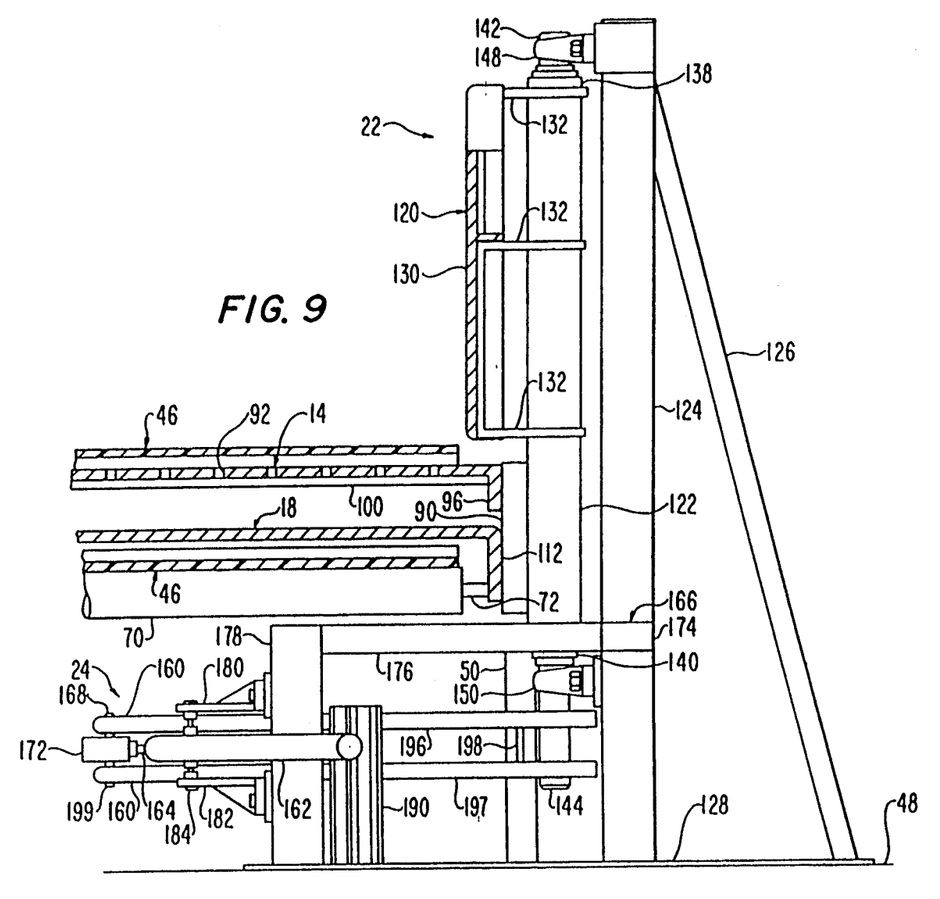
FIG. 9 is a partial end elevational view of a diverter assembly and its activating system in cross section taken along 9—9 of FIG. 7.

A plurality of diverter assemblies 22 are mounted above the endless transport conveyor 16 for diverting the tobacco off the endless transport conveyor 16. Each one of the diverter assemblies 22 is activated by a diverter activating assembly 24 mounted below the endless transport conveyor 16 as seen in FIGS. 7–9.

A supply conveyor 200 extends from one end of the endless transport conveyor 16 for loading the tobacco containers 12 onto the transport conveyor 16.

A plurality of collecting devices or station chutes 26 extend from one side of the endless transport conveyor 16, one station chute 26 being positioned across the endless transport conveyor 16 from each one of the diverter assemblies 22.

An end chute 28 extends from the end of the transport conveyor 16 opposite the supply conveyor 200 for catching wasted or unsorted tobacco. A bin 30 extends from end chute 28 for storing the wasted or unsorted tobacco caught by the end chute 28.

One photoelectric sensor 34 is mounted immediately adjacent each station chute 26. The photoelectric sensors 34 detect the presence of the tobacco containers 12 as they move along the transport conveyor 16. The containers 12 are sorted when a control unit 32 activates the diverter activating system 24 opposite the specified chute 26 into which the container 12 is to be diverted. Upon activating the diverter activating system 24, the activating system's corresponding diverter assembly 22 pushes or diverts the tobacco container 12 into the chute 26.

As seen in FIG. 1, endless transport conveyor 16 is supported above the floor 48 by support 14 and has a first end 40, a second end 42, a longitudinal axis 44, and a foraminous belt 46.

Figure 3:
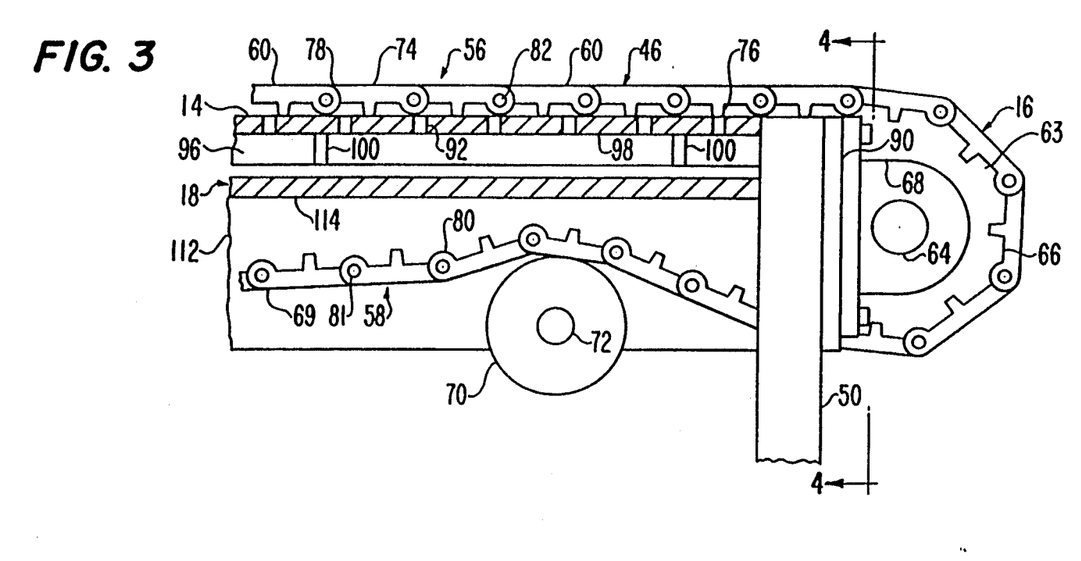
FIG. 3 is a side elevational view of the right end of the tobacco container sorting conveyor of FIG. 2 in partial cross section to illustrate the path of the conveyor belt.
Figure 10:
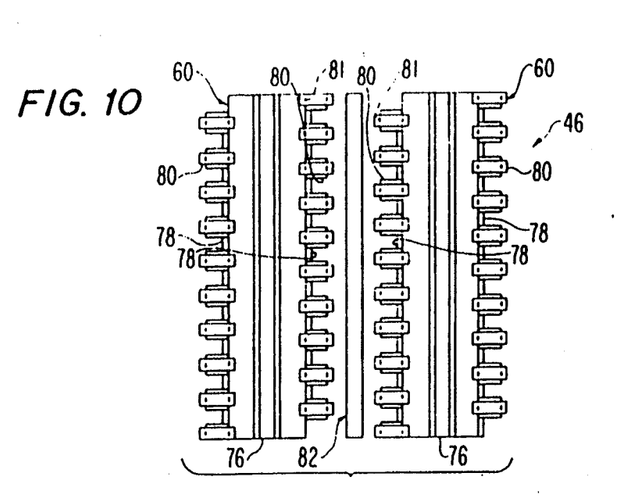
FIG. 10 is an exploded bottom plan view of two sections of the foraminous conveyor belt before being hingeably connected by a plastic rod.

The belt 46 is formed of rigid plastic sections 60 hinged together as shown in FIGS. 3 and 10. Rigid plastic sections 60 have a smooth top surface 74, a ribbed bottom surface 76, and hinging sides 78.

Hinging sides 78 are perpendicular to longitudinal axis 44 and are formed of a plurality of links 80 having transverse holes 81 therethrough. As seen in FIG. 10, when sections 60 are aligned, links 80 thereon mesh and interfit, and sections 60 are pivotally connected by inserting a rigid plastic rod 82 through the holes 81. Rigid plastic sections 60 are preferably formed of polypropylene. The pivotal connections of sections 60 leave small spaces or openings 83 between adjacent sections which pass through from the top to the bottom of the belt 46 formed by sections 60, thereby making the belt foraminous, i.e., having openings therethrough as seen in FIGS. 1, 7, 8 and 10.

As seen in FIGS. 2 and 3, foraminous belt 46 includes a top run 56 and a bottom run 58. Belt 46 endlessly slides along the top run 56, around a drive wheel 63, along the bottom run 58 and around an idler wheel 62.

Top and bottom runs 56 and 58 are substantially parallel. Top run 56 is horizontal, and bottom run 58 is substantially horizontal, but has a catenary sag 69 between return rollers 70.

Return rollers 70 are rotatably coupled to return shafts 72, which are horizontal and perpendicular to longitudinal axis 44. Return shafts 72 are fixedly coupled to collecting device 18. Return rollers 70 support bottom run 58, and are located between the idler and drive wheels 62 and 63.

Idler wheel 62 is fixedly coupled to idle shaft 65 at first end 40, and drive wheel 63 is fixedly coupled to drive shaft 64 at second end 42. Idle shaft 65 is fixedly coupled to a frame member 50. Idler and drive shaft 64 is rotatably coupled at each end to drive bearings 68 (only one is shown), and drive bearings 68 are fixedly coupled to frame member 50. Idler and drive wheels 62 and 63 are formed of rigid plastic material and have sprockets 66 around their outer edge. As seen in FIG. 3, sprockets 66 engage the ribbed bottom surfaces 76 of belt 46, thereby preventing belt 46 from slipping relative to the drive wheels.

Although the drawings show one idler and drive wheel 62 and 63 at each end 40 and 42 of the belt 46, a plurality of wheels at each end 40 and 42 can be coupled along shafts 64 and 65.

The conveyor drive motor 20 powers drive shaft 64 and is conventional and well-known. The size of motor 20 varies with the length of the conveyor, but a five horsepower motor provides sufficient power to drive a 50' transport conveyor.

Figure 4:
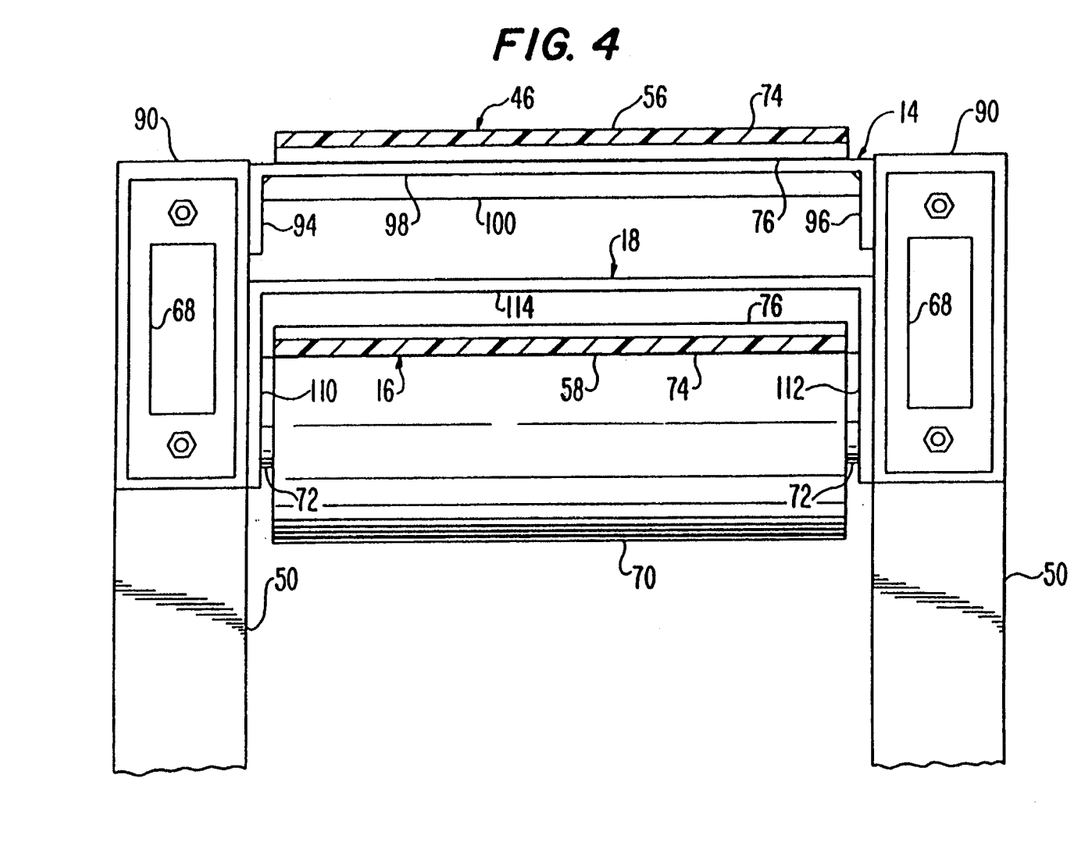
FIG. 4 is an end elevational view of the conveyor in cross section taken along line 4—4 of FIG. 3.
Figures 5, 6:
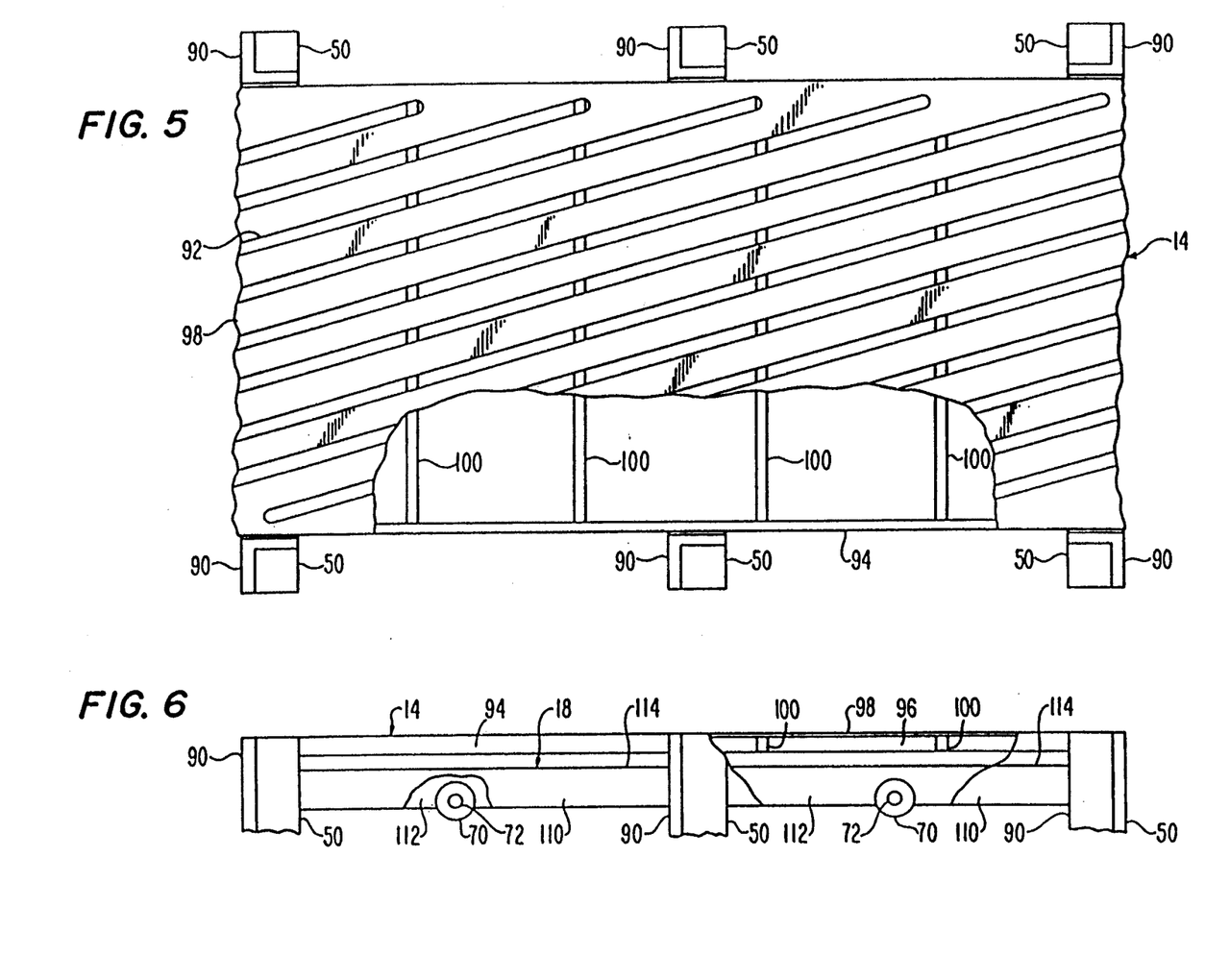
FIG. 5 is a top plan view of the slotted support partially broken away and with the conveyor belt removed.
FIG. 6 is a side elevational view of the slotted support of FIG. 5 and partially broken away.

As seen in FIGS. 4–6, support 14 is fixedly coupled below the top run 56 to brackets 90, preferably by welding. Brackets 90 are L-shaped and fixedly coupled to frame members 50. Frame members 50 extend downwardly from brackets 90 until they reach the floor 48. Frame members 50 are substantially rectangular and are formed of metal.

Support 14 is U-shaped, and has a first wall 94, a second wall 96, and a third wall 98. First and second walls 94 and 96 are planar, vertical and parallel to each other. Third wall 98 is planar, horizontal and perpendicular to first and second walls 94 and 96 and substantially parallel to top run 56 of the belt. The walls 94, 96 and 98 are integral, unitary and one-piece.

First and second walls 94 and 96 are welded to brackets 90. Third wall 98 has slots 92 therethrough, is rectangular, substantially coextensive with top run 56 and slidably receives top run 56 thereon. Third wall 98 is reinforced by flat bars 100.

As seen in FIG. 5, the slots 92 are straight, oriented diagonally to longitudinal axis 44, are relatively long, and extend continuously throughout the width of belt 46. Preferably, slots 92 are two inches wide and four inches apart, and extend at a 15° angle from the longitudinal axis 44; however, slots 92 may be thinner and spaced farther apart if additional belt support is desired. In all events, the surface area of the slots is preferably less than about 50%, and more preferably, equal to or less than about 30% of the overall surface area of the third wall. The slots 92 end two inches from each edge of third wall 98, which is preferably about five feet wide.

Flat bars 100 are welded to the bottom side of third wall 98, between first and second walls 94 and 96, and can be either perpendicular or parallel to longitudinal axis 44. They provide additional support for third wall 98. Preferably, flat bars 100 are spaced every two feet.

Collecting pan 18, as seen in FIGS. 3 and 4, is fixedly coupled below support 14 to frame members 50 by brackets 90. Collecting pan 18 collects tobacco particles falling from the tobacco containers 12 conveyed across top run 56 and falling through slots 92 in support 14.

Collecting pan 18 is U-shaped, and has a first face 110, a second face 112, and a third face 114. First and second faces 110 and 112 are planar, vertical and parallel to each other and are welded to brackets 90. Third face 114 is planar, horizontal and perpendicular to first and second faces 110 and 112. Third face 114 is substantially parallel to support wall 98 and catches the tobacco dust falling through slotted support 14. First, second and third faces 110, 112 and 114 are one-piece, unitary and integrally formed of metal.

As seen in FIGS. 1 and 2, diverter assemblies 22 selectively sort the tobacco containers 12 as they move along top run 56 of endless transport conveyor 16. The diverter assemblies 22 are identical, and therefore, only one will be discussed in detail.

As seen in FIG. 9, each diverter assembly 22 includes a blade or diverter 120, pivot shaft 122, diverter support 124, diverter brace 126, and a diverter frame 128. Each assembly 22 pivots between a first rest position 210 and a second actuated position 212 when activated by a diverter activating assembly 24.

As seen in FIGS. 7-9, blade 120 acts as an arm or gate for pushing tobacco containers 12 off endless conveyor 16 into a station chute 26, and is preferably formed of metal.

When blade 120 is parallel to the longitudinal axis 44 and adjacent the endless transport conveyor 16, the diverter assembly 22 is in its first position 210 as seen in FIG. 7. When blade 120 pivots and becomes substantially transverse to the longitudinal axis 44, the diverter assembly 22 is in the second actuated position 212 as seen in FIG. 8.

Blade 120 is securely coupled, preferably by welding, to pivot shaft 122, and includes a container engaging face 130 and a plurality of mounting arms 132. Container engaging face 130 is preferably trapezoidal, stands vertically, and is mounted opposite a station chute 26. Mounting arms 132 are horizontal and parallel to each other, and extend perpendicularly and outwardly from container engaging face 130 away from transport conveyor 16. Mounting arms 132 are preferably evenly spaced from top to bottom of container engaging face 130. Mounting arms 132 are fixedly coupled to the top end 138 of pivot shaft 122, preferably by welding.

Pivot shaft 122, as seen in FIG. 9, is vertical, tubular and formed of metal. It includes a top end 138, a bottom end 140, a first end pin 142, and a second end pin 144. Pivot shaft 122 is pivotally mounted to diverter support 124.

As seen in FIG. 9, first end pin 142 extends upwardly from top end 138, and second end pin 144 extends downwardly from bottom end 140. First and second end pins 142 and 144 are fixedly coupled to pivot shaft 122.

Diverter support 124 is vertical, parallel to pivot shaft 122 and formed of metal. Diverter support 124 has a first bearing 148 and a second bearing 150 fixedly mounted thereon.

First bearing 148 extends perpendicularly from diverter support 124, and rotatably couples first end pin 142 to diverter support 124. Second bearing 150 extends perpendicularly from diverter support 124, and rotatably couples second end pin 144 to diverter support 124. First and second bearings 148 and 150 are fixedly coupled to diverter support 124 by a conventional bolt assembly comprising a bolt, flat washer, lock washer, and nut.

Diverter brace 126 extends from diverter support 124 at the point adjacent first bearing 148 and extends at an angle downwardly and outwardly from diverter support 124 away from transport conveyor 16 to diverter frame 128. Diverter brace 126 thereby provides additional support to the diverter assembly 22, and is also formed of metal.

Diverter frame 128 is rectangular, fixedly coupled to the floor 48, and is formed of metal. Preferably, frame 128 is bolted to the floor 48.

As seen in FIGS. 7-9, diverter activating assembly 24 includes a pivot arm 160, a pneumatic cylinder 162 having a piston therein (not shown), a piston rod 164, and a cylinder mount 166.

Pivot arm 160 is fixedly coupled at one end to second end pin 144 and is pivotally coupled at its other end to piston rod 164 at pivot joint 168. First and second stops 170 and 171 are coupled to pivot arm 160 between its two ends with one stop located on each side of the pivot arm 160. As seen in FIG. 9, pivot arm 160 has a top arm 196 and a bottom arm 197 integrally and unitarily connected at connecting arm 198.

Pivot arm 160 is mounted between stop arms 190 and 192. Each set of stop arms 190 and 192 is arcuately aligned with stops 170 and 171 and has shock absorbers 194 and 195 mounted therebetween. Shock absorbers 194 and 195 are conventional and well known. Stop arms 190 and 192 are fixedly coupled to diverter frame 128, and extend upwardly therefrom.

When the diverter assembly 22 is in its first position 210, as in FIG. 7, first stop 170 rests against stop arm 190. As the diverter activating assembly 24 pivots diverter assembly 22 into its second position 212, the pivot arm 160 rotates until second stop 171 engages second stop arm 192. Shock absorbers 194 and 195 lessen the force on the pivot arm 160 as it engages stop arms 190 and 192.

Pneumatic cylinder 162 has a piston therein (not shown) with which one end of the piston rod 164 is connected. The rod 164 has a knuckle or clevis 172 at its other end. The knuckle 172 is pivotally coupled between top and bottom arms 196 and 198 of pivot arm 160 at pivot joint 168 by pivot pin 199.

Cylinder mount 166 has a first, second and third arm 174, 176 and 178.

First arm 174 is securely coupled to diverter support 124, and extends perpendicularly and outwardly therefrom. Second arm 176 is integrally and unitarily coupled to first arm 174, and extends perpendicularly and inwardly toward longitudinal axis 44. Third arm 178 is integrally and unitarily coupled to second arm 176 and extends perpendicularly and downwardly until it meets the diverter frame 128, where it is securely coupled thereto.

Third arm 178 has a first flange 180 and second flange 182 extending therefrom. Flanges 180 and 182 extend inwardly toward longitudinal axis 44 from third arm 178. They are parallel and spaced apart, thereby allowing pneumatic cylinder 162 to be pivotally coupled therebetween at cylinder joint 184.

As seen in FIGS. 7 and 8, mount support 186 is securely coupled to one side of third arm 178 and extends outwardly, perpendicularly and downwardly therefrom. Mount support 186 provides support to cylinder mount 166.

As seen in FIG. 1, supply conveyor 200 is directly adjacent and feeds onto transport conveyor 16 at its first end 40. Supply conveyor 200 is mounted to the floor 48 at one end and progresses upwardly at an angle until it is immediately adjacent first end 40 of transport conveyor 16. Supply conveyor 200 is also an endless belt. Tobacco containers 12 are placed on supply conveyor 200 and transported to transport conveyor 16 for sorting.

Station chutes 26 extend from support 14 downwardly and slightly arcuately until they engage the floor 48. One station chute is located across the top run 56 of belt 46 from each diverter blade 120. Station chutes 26 are formed of sheet metal.

End chute 28 extends from second end 42 of endless transport conveyor 16 downwardly and arcuately to the floor 48.

Bin 30 rests on the floor 48 adjacent end chute 28, and catches the tobacco waste coming down end chute 28.

As shown in FIG. 1, a control unit 32 and a plurality of photoelectric sensors 34 are used to activate a specified diverter assembly 22 which diverts or pushes the tobacco container 12 into the adjacent station chute 26, thereby sorting the tobacco. This system will be discussed in further detail below.

The photoelectric sensors 34 are mounted immediately above the transport conveyor 16. Preferably, one sensor is mounted just before each station chute 26. This allows for the possibility of the tobacco containers 12 being sorted into any of one the station chutes 26.

Operation

Conveyor drive motor 20 imparts rotary motion to drive shaft 64 which thereby rotates drive wheel 63. Drive wheel 63 thereby imparts sufficient force on belt 46 to start the belt's endless sliding motion. Foraminous belt 46 endlessly slides across the third wall 98 of support 14, around idler wheel 62, over return rollers 70, and around drive wheel 63.

As belt 46 slides over return rollers 70, they rotate about return shafts 72.

Tobacco containers 12 are placed on supply conveyor 200, and thereby transported to transport conveyor 16. When the tobacco containers 12 reach the top of supply conveyor 200, the motion of supply conveyor 200 forces the tobacco containers 12 onto endless transport conveyor 16. As seen in FIGS. 1 and 2, transport conveyor 16 conveys the tobacco 12 along top run 56 of belt 46 until one of the diverter assemblies 22 selectively activates to divert the tobacco from the belt 46 into a station chute 26.

The tobacco containers 12 are sorted based on the data input to control unit 32 by an operator or input device. The signal received for each tobacco container 12 is assigned a value called a sort code. This value or sort code is stored within the control unit's memory. The sort code will determine the destination of each tobacco container 12.

The release of containers 12 is dependent on a sort code value being received, recorded and an appropriate amount of time passing since the last container 12 left the input station or starting position on supply conveyor 200. This release sequence is controlled by a network of logic referred to as traffic control. The primary purpose of the traffic control network is to maintain consistent spacing between containers 12 on the transport conveyor 16 to ensure that the sort code value can be safely transferred with the container 12.

The transport conveyor 16 is divided into stations with a photoelectric sensor 34 located at the leading edge of each of these stations. These photoelectric sensors 34 indicate when a container 12 is both entering a new station and leaving the previous station. This allows the sorting system to track the movement of the tobacco container 12.

As the container 12 is tracked from station to station, the sort code for that tobacco container 12 is transferred with it. A station may or may not have a diverter assembly 22 mounted thereto.

The tobacco container 12 is sorted if the sort code matches or has an equal value to that of the station in which it is currently. When a tobacco container 12 arrives at its correct station or destination, it will be diverted into a station chute 26 and thereby sorted.

FIG. 7 shows a tobacco container 12 approaching its sorting station. At this point, the diverter assembly 22 has not been actuated and the diverter blade 120 is in its first rest position 210.

When the tobacco container 12 enters its sorting station as in FIG. 8, the diverter assembly 22 is actuated and the diverter blade 120 pivots from its first rest position 210 to its second actuated position 212.

To pivot the diverter blade 120 from the first position 210 to the actuated position 212, pneumatic cylinder 162 is activated, thereby extending piston rod 164 and rotating pivot arm 160 and pivot shaft 122 as shown in FIGS. 7 and 8. The motion of pivot shaft 122 rotates diverter blade 120 from its first rest position 210 to its second actuated position 212.

Furthermore, when diverter activating assembly 24 is actuated and after diverter assembly 22 has reached its second actuated position 212, second stop 171 engages second shock absorber 195 and second stop arms 192, thereby preventing pivot arm 160 from over-rotating.

After diverter blade 120 has diverted the tobacco container 12 into the station chute 26, cylinder 162 is activated in the opposite direction and diverter blade 120 rotates from its second actuated position 212 to its first rest position 210. This allows subsequent tobacco containers 12 to pass through the station without being diverted and continue down the transport conveyor 16 until selectively sorted by a different diverter assembly.

As the tobacco containers 12 are conveyed along transport conveyor 16, dust and loose tobacco leaves tend to separate from the tobacco containers 12. The foraminous belt 46 and the slotted support 14 allow tobacco particles located anywhere on the belt 46 to fall through the belt 46 and the support 14 onto the collecting pan 18. The particles can then be vacuumed off collecting pan 18 periodically.

Because of the slots' diagonal orientation, any and all of the particles that fall through the belt 46 also fall through the slotted support 14 to the collecting pan. No particles can build up between slots 92 after falling through the belt 46, because the belt's movement sweeps all particles into the next adjacent slot 92. This is a significant advantage over longitudinally oriented slots, which would allow buildup of the particles. In addition, the diagonal slots can be made narrow, and thus, leave significant surface area on the third wall of the slotted support 14 to provide greater support to the belt 46.

Larger pieces of tobacco waste, such as whole leaves, which cannot fall through the foraminous belt 46, continue down the transport conveyor 16 until they reach the end chute 28. The tobacco waste then falls down end chute 28 and into bin 30, where it can be collected and even reused.

Second Embodiment of FIGS. 11-14

As seen in FIGS. 11-14, a second embodiment of the tobacco container sorting conveyor 10a includes diverter assemblies 22a, activating assemblies 24a, a slotted support 14a, station chutes 26a, a first side 52a and a second side 54a.

Figure 12:
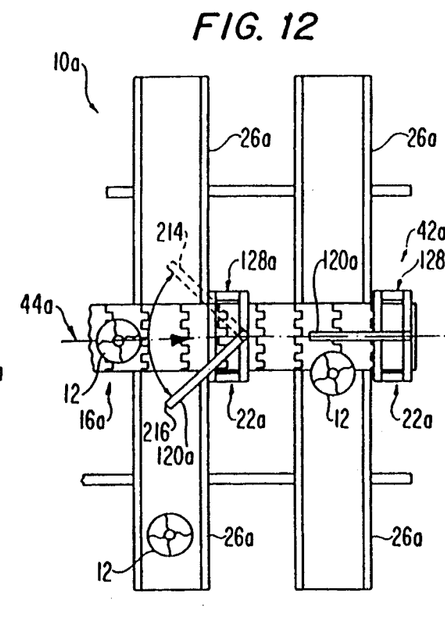
FIG. 12 is a partial top plan view of the conveyor showing an alternate diverter assembly.
Figure 13:
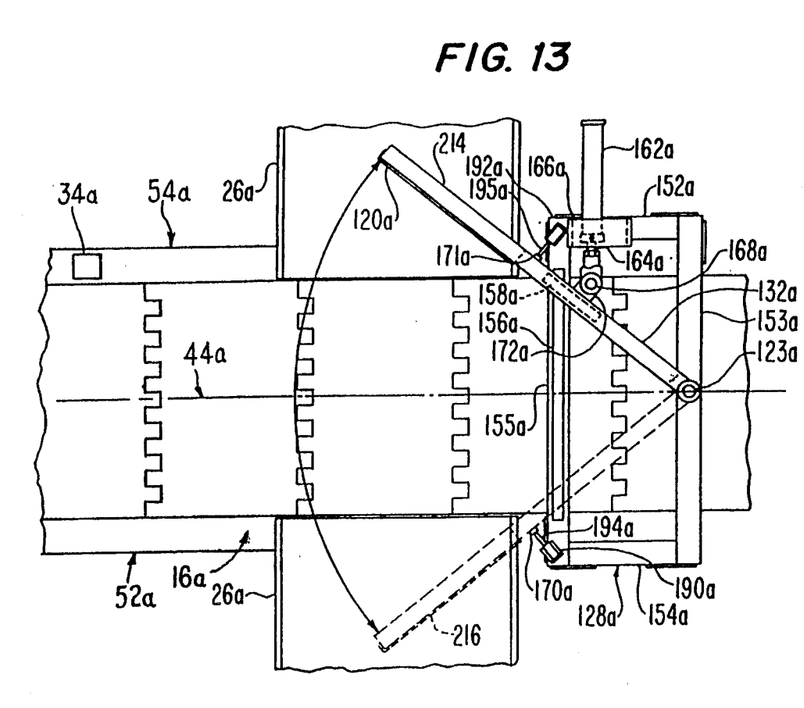
FIG. 13 is a top plan view of the alternate diverter assembly and its activating assembly.
Figure 14:
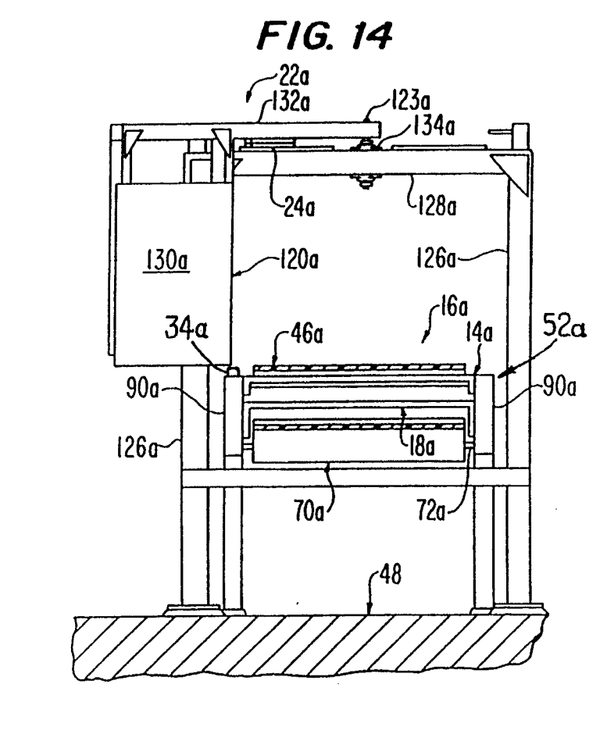
FIG. 14 is an end elevational view of the diverter assembly and activating assembly shown in FIG. 12.

Diverter assemblies 22a are identical. Therefore, only one will be described in detail. Diverter assembly 22a, as seen in FIGS. 12-14, includes a diverter blade 120a, mounting arm 132a, pivot pin 123a and bearing 134a, and is mounted above the transport conveyor 16a. As seen in FIG. 12, diverter assembly 22a rotates between a first activated position 214 and a second activated position 216.

Diverter blade 120a is rectangular and fixedly coupled to one end of mounting arm 132a. Diverter blade 120a includes a container engaging face 130a and extends downwardly from mounting arm 132a toward the transport conveyor 16a.

Mounting arm 132a is fixedly coupled at one end to pivot pin 123a and at the other end to diverter blade 120a. Mounting arm 132a is substantially horizontal and parallel to transport conveyor 16a.

Pivot pin 123a is rotatably mounted to bearing 134a, and extends upwardly therefrom through mounting arm 132a.

As seen in FIG. 13, bearing 134a is fixedly coupled to diverter frame 128a directly above longitudinal axis 44a. Diverter frame 128a has four bars 152a-155a rigidly coupled to form a rectangle. Fourth bar 155a is perpendicular to longitudinal axis 44a and has a wear bar 156a therein (discussed in more detail below).

Diverter braces 126a extend perpendicularly and downwardly from the four corners of diverter frame 128a to the floor 48.

When diverter assembly 22a is in its first position 214, diverter blade 120a extends from pivot pin 123a outwardly and away from one side of longitudinal axis 44a at an acute angle of approximately 40°, and when in the second position 216, diverter blade 120a extends from pivot pin 123a outwardly and away from the other side of longitudinal axis 44a at an acute angle of about 40°. Diverter blade 120a moves or sweeps between the first position 214 adjacent the second side 54a of conveyor 10a and the second position 216 adjacent the first side 52a of conveyor 10a in a transverse motion across longitudinal axis 44.

Specifically, diverter blade 120a moves from first position 214 to second position 216 when diverting a tobacco container 12 off conveyor 10a. When diverter blade 120a is between first and second positions 214 and 216 and substantially aligned along longitudinal axis 44, engaging face 130a engages the tobacco container 12 and pushes it into an adjacent station chute 26a. Then, so that the movement of subsequent tobacco containers is not inhibited, diverter blade 120a continues pivoting until reaching either the first or second positions 214 or 216.

As seen in FIG. 13, collecting devices or station chutes 26a preferably extend from both sides 52a and 54a of the conveyor 10a, forming a first set of collecting devices on the first side and a second set of collecting devices on the second side of conveyor 10a. Each chute 26a is aligned directly across the conveyor 10a from another chute 26a, forming a transverse pair. Thus, diverting blades 120a are located between each transverse pair of chutes 26a. Alternatively, chutes 26a may only line one side of conveyor 10a. The chutes 26a are positioned along the conveyor 10a directly before a diverter assembly 22a.

Diverter activating assembly 24a includes a pneumatic cylinder 162a, piston rod 164a, cylinder mount 166a, pivot joint 168a, knuckle 172a, and guide bar 158a. Pneumatic cylinder 162a is pivotally mounted to cylinder mount 166a, and cylinder mount 166a is fixedly coupled to diverter frame 128a. Cylinder 162a has a piston therein (not shown) with which one end of the piston rod 164a is connected. The rod 164a has a knuckle or clevis 172a at its other end. The knuckle 172a is pivotally coupled at pivot joint 168a to mounting arm 132a. Guide bar 158a is fixedly coupled to the bottom of mounting arm 132a. As mounting arm 132a pivots between positions 214 and 216, mounting arm 132a is supported by guide bar 158a and guide bar 158a slides across the top of wear bar 156a.

Diverter activating assembly 24a operates in substantially the same way as diverter assembly 24. However, as piston rod 164a extends, guide bar 158a slides along wear bar 156a, thereby keeping cylinder 162a properly aligned and providing additional support.

As seen in FIG. 13, piston rod 164a has not been activated, and diverter blade 120a is in the first position 214. As the piston rod 164a extends, cylinder 162a and knuckle 172a pivot, guide bar 158a begins to slide along wear bar 156a, and diverter blade 120a pivots or sweeps from first position 214 to second position 216. When piston rod 164a is fully extended, diverter blade 120a is in the second position 216.

As discussed above, stops 170a and 171a, stop arms 190a and 192a, and shock absorbers 194a and 195a prevent diverter blade 120a from over-rotating.

Figure 11:
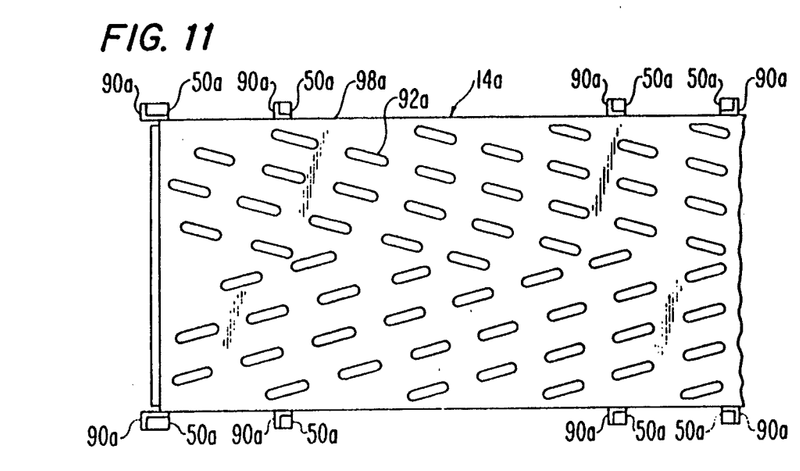
FIG. 11 is a top plan view of an alternate form of the slotted support with the conveyor belt removed.

As seen in FIG. 11, slotted support 14a has relatively short slots 92a spaced apart and formed into two groups extending at an angle inwardly toward both sides of the longitudinal axis 44. These shorter slots 92a may provide even more belt support than the slots shown in FIG. 5 because of their decreased length and thus, the increased surface area of third wall 98a. That is, the surface area of these slots is less than about 30% of the surface area of the third wall, and preferably substantially about 20%. Furthermore, because these slots 92a are also oriented diagonally, all of the particles that fall through the belt also fall through slotted support 14a to the collecting pan.

More specifically, with respect to the operation of conveyor 10a, the tobacco containers 12 are moved along the conveyor 10a through the sensors and stations, as previously discussed with respect to the operation of conveyor 10, and the operation of conveyor 10a is the same as that described above for conveyor 10, except as further explained below. As the tobacco container 12 enters a new station, each photoelectric sensor 34a located at the leading edge of each station senses the tobacco container's presence and signals the control unit 32. If the tobacco container 12 has reached the sensor adjacent the collecting device or chute 26a into which the tobacco container is preselected to be sorted, the control unit, responding to a signal from the sensor, actuates that station's diverter activating assembly 24a.

If the tobacco container 12 is to be sorted or diverted into the chute 26a on the first side 52a of that station, the diverter blade 120a must be in its first position 214. Likewise, if the tobacco container 12 is to be sorted into the chute 26a on the second side 54a of that station, the diverter blade 120a must be in its second position 216. Thus, if the blade 120a is on the incorrect side, i.e., in the incorrect position, when the tobacco container 12 to be sorted enters the station, the control unit senses this and immediately actuates the activating assembly 24a which changes the position of blade 120a.

Also, the moment that the tobacco container 12 enters a new station, a station timer associated with the control unit begins to run. When the station timer's time runs out, the diverter blade 120a, which has previously been moved to its proper position, if necessary, diverts the tobacco container 12 into the specified chute 26a by changing positions unless the sensor is "blocked", in which case the tobacco container 12 continues down the conveyor 10a to a default or overflow chute at the end of the conveyor. A sensor is "blocked" if it senses something it should not sense. For instance, if two containers are immediately adjacent one another, if a piece of tobacco has come loose from the container to be sorted, or if the specified chute 26a is congested, the sensor is "blocked".

If the tobacco container 12 is not to be diverted or sorted into either chute within the station, the container 12 moves along the conveyor 10a to the next station. The process begins all over again and continues until the tobacco container 12 reaches its specified chute 26a and is sorted.

Thus, conveyor 10a conveys the series of tobacco containers 12 in a first direction or run along the stations of conveyor 16a, senses the presence of each of the tobacco containers via sensors 34a as the containers are conveyed into each station along the conveyor 16a, generates via the sensors a series of signals representing the presence of each of the tobacco containers at each station, and selectively diverts each of the tobacco containers transversely of the conveyor 16a at preselected intervals corresponding to the chutes in each station in response to the series of signals, such diversion taking place into the chutes on the first and second sides of the conveyor 16a as desired and preselected. Such transverse diversion is substantially perpendicular to the conveyor 16a as shown in FIG. 12, and in opposite directions, depending upon whether the diversion is to the first or second side of the conveyor 16a.

While two advantageous embodiments have been chosen to illustrate the invention, it will be understood by those skilled in the art that various changes and modifications can be made herein without departing from the scope of the invention as defined in the appended claims.

What is claimed is:

1. A conveyor for selectively sorting tobacco containers, the combination comprising:
   a support;
   an endless conveyor carried by said support and having first and second sides;
   means for collecting the tobacco containers located along said endless conveyor comprising a first set of collecting means on said first side, and a second set of collecting means on said second side, each of said collecting means in said first set being transversely aligned with one of said collecting means in said second set, and thereby forming a set of transverse pairs of collecting means; a plurality of pivotal diverting blades for diverting the tobacco containers located between said transverse pair of collecting means, said diverting blades having a first pivot position for diverting said tobacco containers into said second set of collecting means and a second pivot position for diverting said tobacco containers into said first set of collecting means;
   actuating means, coupled to said diverting blades, for selectively actuating said diverting blades to divert a selected tobacco container into a selected collecting means on either side of said endless conveyor; and
   control means for moving said diverting blades from said second position to said first position adjacent said first side of said conveyor prior to arrival of said tobacco containers for diverting said tobacco containers into a selected collecting means on said second side of said conveyor, and for moving said diverting blades from said first position to said second position adjacent said second side of said conveyor prior to arrival of said tobacco containers for diverting said tobacco containers into a selected collecting means on said first side of said conveyor.

2. A conveyor according to claim 1, wherein said actuating means comprises sensor means, associated with each pair of collecting means, for sensing the position of the tobacco container.

3. A conveyor according to claim 2, wherein said sensor means comprises a photoelectric sensor.

4. A conveyor according to claim 2, wherein said collecting means comprises a plurality of chutes.

5. A conveyor according to claim 1, including:
   sensor means sensing whether said diverting blades are in said first position or in said second position for determining whether said diverting blades need to be moved to one of said first and second positions prior to an arrival of said tobacco container at said diverting blades and providing a responsive signal to said control means.

6. A method of selectively sorting tobacco containers, comprising the steps of:
   conveying a series of tobacco containers in a first direction along a series of stations,
   sensing the presence of each of the tobacco containers as they are conveyed into each station and generating a series of signals representing the presence of each tobacco container at each station, and
   selectively diverting each of the tobacco containers transversely of the first direction at preselected stations in response to the series of signals;
   diverting said containers using a pivotal diverting blade transversely in a second direction perpendicular to the first direction and diverting said containers in a third direction perpendicular to the first direction and opposite the second direction; and
   determining the position of said pivoting diverting blade prior to diverting a selected tobacco container and moving said diverting blade between different starting pivot positions prior to the arrival of said selected container so as to divert said tobacco container to a desired one of said second and third directions.

7. A tobacco container conveyor comprising:

an endless conveyor having a longitudinal axis and a foraminous belt with top and bottom runs;

means for driving said conveyor in an endless path;

a longitudinal support located below said top run and slidably receiving said top run thereon, said support having a plurality of spaced elongated slots therethrough, and said support being substantially coextensive with said top run; and a longitudinal collector disposed directly below said longitudinal support and directly communicating with said support and elongated slots and between said top and bottom runs, for collecting tobacco particles falling directly through said slots from tobacco containers conveyed on said top run;

said elongated slots being elongated and angled from said longitudinal axis in the direction of travel of said conveyor, and said elongated slobs being spaced generally across an entire width of said support upon which said belts slides;

said foraminous belt including a plurality of links having a pair of end links and protruding ribbed bottom surfaces intermediate said end links which extend transverse to said support;

said top run of said belt having said plurality of protruding ribbed bottom surfaces extending downwardly from said top run so that particles falling onto said support are swept by said movement of said belt into a next adjacent slot and do not accumulate on said support.

8. The apparatus of claim 7 wherein said elongated slots having a width less than a width of said support between adjacent slots.

9. A conveyor according to claim 7, wherein said slots encompass a surface area of about thirty percent of the overall surface area of said support.

10. A conveyor according to claim 7, wherein said slots encompass a surface area of less than about thirty percent of the overall surface area of said support.

11. A conveyor according to claim 7, wherein said slots are oriented at about 15° diagonally relative to said longitudinal axis.

* * * * *